June 3, 1952 M. LEHMANN 2,599,524
INDUSTRIAL LIFT TRUCK
Filed Dec. 9, 1947 6 Sheets-Sheet 1

*INVENTOR.*
MAX LEHMANN
BY Geo. B. Pitts

ATTORNEY.

June 3, 1952 M. LEHMANN 2,599,524
INDUSTRIAL LIFT TRUCK
Filed Dec. 9, 1947 6 Sheets-Sheet 2

INVENTOR.
MAX LEHMANN
BY Geo. B. Ditto
ATTORNEY

June 3, 1952     M. LEHMANN     2,599,524
INDUSTRIAL LIFT TRUCK
Filed Dec. 9, 1947     6 Sheets-Sheet 3

INVENTOR.
MAX LEHMANN
BY
Geo. R. Vitto
ATTORNEY

June 3, 1952 — M. LEHMANN — 2,599,524
INDUSTRIAL LIFT TRUCK
Filed Dec. 9, 1947 — 6 Sheets-Sheet 6
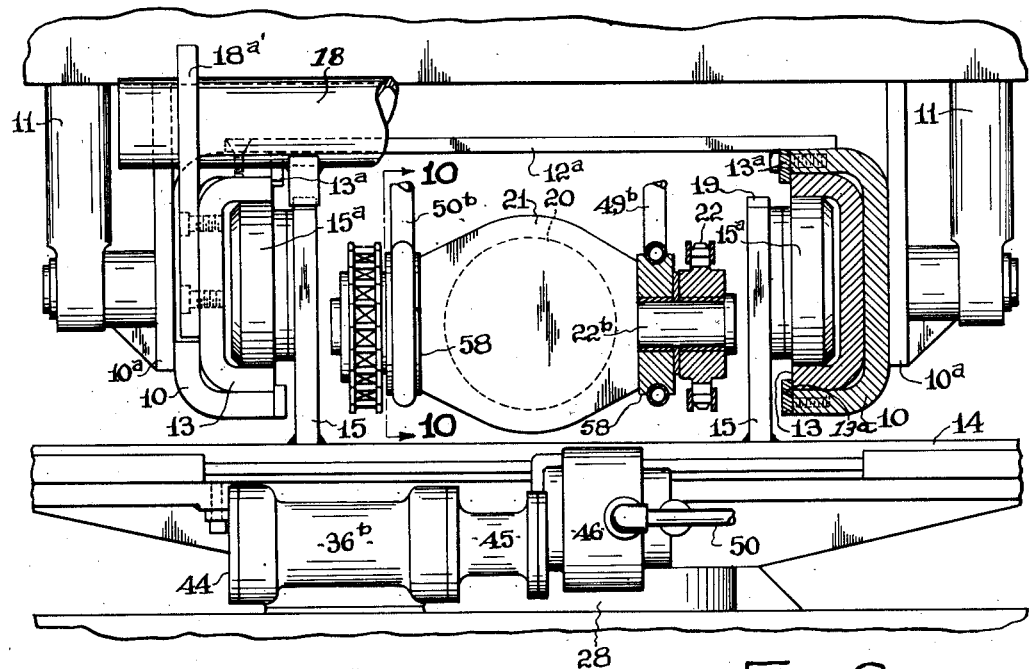
FIG. 8
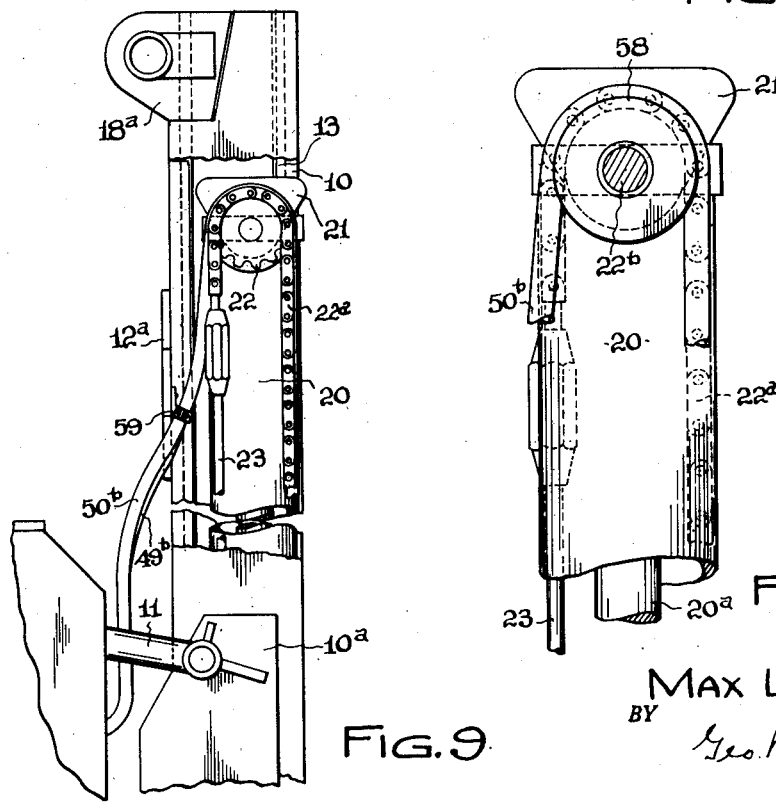
FIG. 9
FIG. 10
INVENTOR.
MAX LEHMANN
BY
Geo. B. Pitts
ATTORNEY Patented June 3, 1952

2,599,524

UNITED STATES PATENT OFFICE 2,599,524

INDUSTRIAL LIFT TRUCK

Max Lehmann, Cleveland, Ohio, assignor to The Baker-Raulang Company, Cleveland, Ohio, a corporation of Ohio Application December 9, 1947, Serial No. 790,571

4 Claims. (Cl. 214—113)

This invention relates to a vehicle of the load elevating type, the elevating member having a load carrier which may be moved relative to the elevating member to facilitate pick-up of a load, transportation thereof and/or discharge of the load from the carrier. The load carrier may be of any desired form of construction dependent on the shape of the load to be handled.

One object of the invention is to provide in a vehicle of this type an improved mounting for the load carrier and power operated means for rotating the carrier predetermined distances, to position it into pick-up position or, if the carrier is loaded, to rotate the carrier and load to a carrying position, whereby transportation of the load may be effected safely and expeditiously or to position the load for discharge.

Another object of the invention is to provide in a vehicle of this type having a rotatably mounted load carrier, improved power means adapted to rotate the carrier with a minimum expenditure of power and devoid of jerks and vibrations.

Another object of the invention is to provide in a vehicle of this type an improved rotatably mounted carrier and power operating means therefor adapted to be readily mounted on the truck elevating member.

Another object of the invention is to provide in a vehicle of this type having a rotatable load carrier, improved operating means for the carrier located between the carrier and the guides for the elevating member and so connected with the carrier as to require minimum driving power therefor, whereby the driving connections and motor may be relatively simple in construction and eliminate undue overhang of the carrier relative to the guides.

A further object of the invention is to provide in a vehicle having an elevating member, a load carrier movably mounted thereon and hydraulically operated means for moving the carrier, improved means for supporting the liquid supply connections leading to the hydraulically operated means to prevent slack in such connection during movement of the elevating member and insure uniform and continuous flow of the liquid through the connections during operation of the elevating member.

A further object of the invention is to provide in a vehicle of this type, having on the elevating member a mounting for a rotatable load carrier, improved power means comprising gearing and a hydraulic motor on the mounting for driving the gearing and liquid supply and discharge connections for the motor connected with a source of supply on the truck and incorporated in and movable with the elevating mechanism for the elevating member, whereby the connections are supported during movement of the elevating member and in all positions devoid of slack.

Other objects of the invention will be apparent to those skilled in the art to which my invention relates from the following description taken in connection with the accompanying drawings, wherein:

Fig. 8 is a view similar to Fig 5, but showing a modified form of construction.

Fig. 9 is a fragmentary elevation, partly in section on the line 10—10 of Fig. 8 looking toward the left.

Fig. 10 is a fragmentary section on the line 10—10 of Fig. 8.

Figure 1:
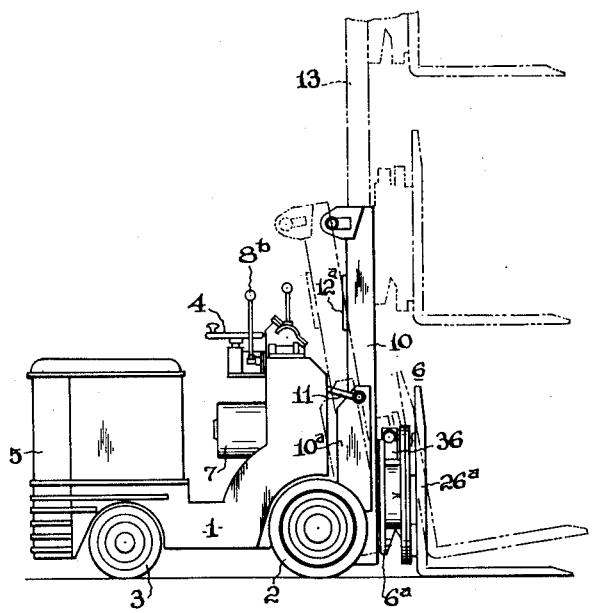
Fig. 1 is a side elevation of an elevating vehicle, shown somewhat diagrammatically and provided with a rotatable carrier, embodying my invention.
Figure 2:
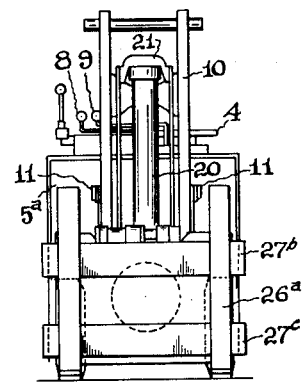
Fig. 2 is a front elevation.

The herein disclosed invention is shown embodied in a self-propelled or power driven truck, consisting generally as follows: 1 indicates a frame supported on a front pair of wheels 2 and a rear pair of wheels 3. Either pair of wheels may be mounted for angular movement to effect steering of the truck by operation of a wheel 4, and either pair of wheels may be driven by suitable mechanism (not shown) having a power supply (internal combustion engine, electric supply means or hydraulic supply mechanism) enclosed in a housing 5, which for illustrative purposes is mounted on the rear portion of the frame 1. The construction of the truck frame and the parts referred to form no part of the present invention and may therefore be of any desired construction and arrangement.

6 indicates as an entirety an elevating mechanism preferably suitably mounted on the frame 1 for tilting inwardly, as shown in dotted lines in Fig. 1. The means for operating and tilting the elevating mechanism 6 may be of the electric or hydraulic type. Where this latter referred to type is employed, a motor 7 is used for operating a pump, and the control of the motor and liquid from and to the pump is effected by suitable levers (only two of the levers designated 8 and 9 being shown); but the disclosure and all reference herein to the hydraulic means for raising and lowering the elevating member and swinging the guides therefor are merely descriptive and not intended to be limiting of the invention.

The elevating mechanism 6 comprises suitable guide means (later referred to) and an elevating member (indicated as an entirety at 6a) supported on and movable relative to the guide means and adapted to support a carrier thereon at different elevating positions, whereby such mechanism may have a wide range of utility.

Referring to the elevating mechanism 6, 10 indicates a pair of spaced guide elements provided with reinforcing plates 10a, having inwardly extending portions which are suitably fulcrumed on the frame 1 at 10x. 11 indicates rods the outer ends of which are pivotally connected to the plates 10a and extend inwardly therefrom, the inner end of each carrying a piston reciprocatable in a cylinder 10b, to which liquid under pressure is supplied in a well known manner, whereby the elevating mechanism 6 may be tilted inwardly and moved outwardly to its normal or vertical position. The cylinders for the pistons on the rods 11 and other parts for the supply and discharge of the liquid are mounted on a housing 5a. The guide elements 10 are connected at their lower ends by a base 12 and intermediate their upper and lower ends by a plate 12a. The guide elements 10 are channel shaped in cross section and, if desired, the elevating member 6a may be slidably mounted directly thereon, but to provide for a wider range of loading, unloading and stacking operations I mount a pair of guide members 13 for slidable or telescopic movement in the guide elements 10. As shown, the elevating member 6a is slidably supported in the guides 13. 13a indicate guides fixed to the end walls of the guide elements 10 by a plurality of screws, one being shown at 13a', and extend longitudinally of the guides 10. As shown, the guides 13a throughout their length overlap the end walls of the guides 13 to maintain the latter in slidable relation to the guide elements 10.

In this arrangement the guide members 13 may be moved endwise of the guide elements 10 and the elevating member 6a moved longitudinally of the guide members 13 to the upper ends thereof and thus serve to operate the elevating member 6a to a level higher than would be otherwise permitted by the guide elements 10, as shown in dotted lines in Fig. 1.

Figure 5:
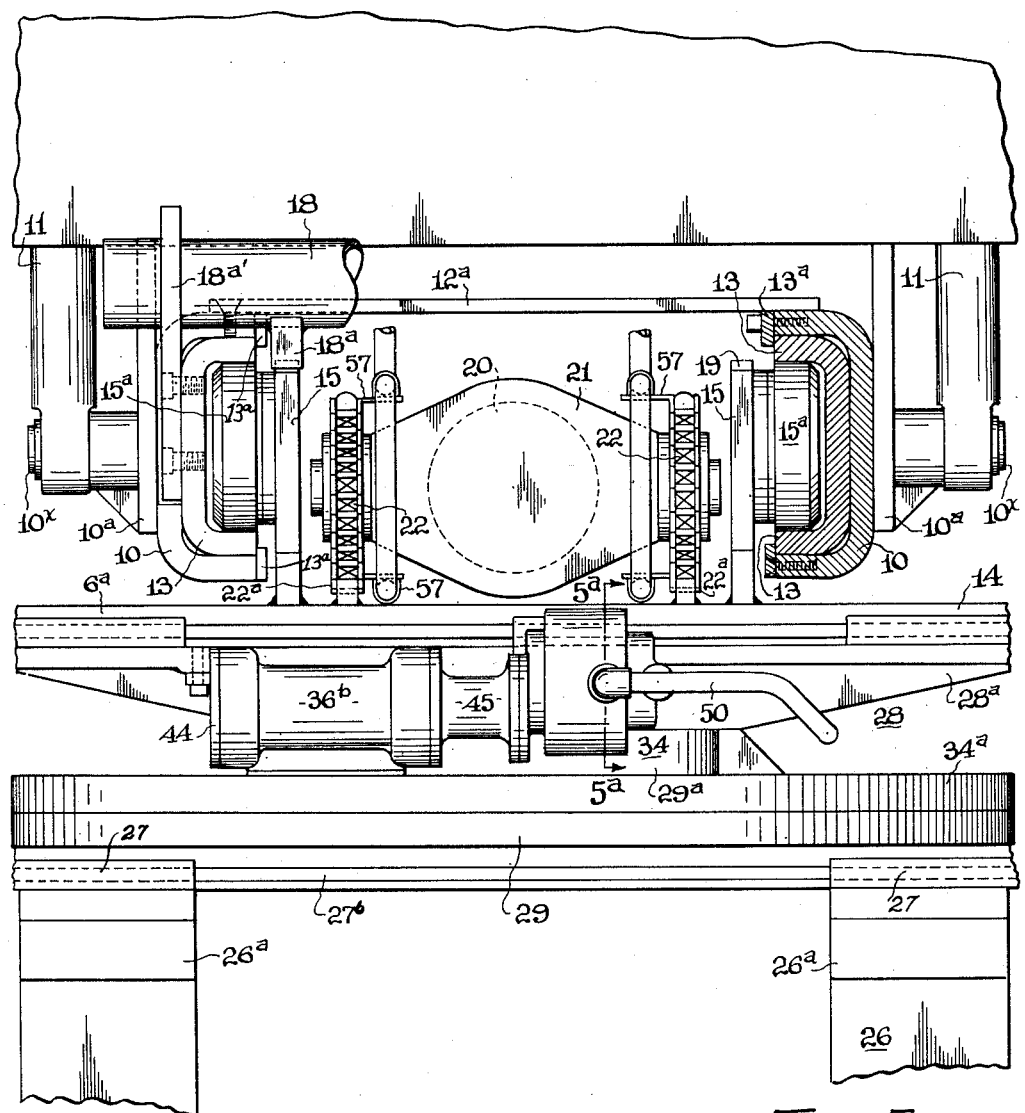
Fig. 5 is a plan view, parts being in section on the line 5—5 of Fig. 4.
Figure 5A:
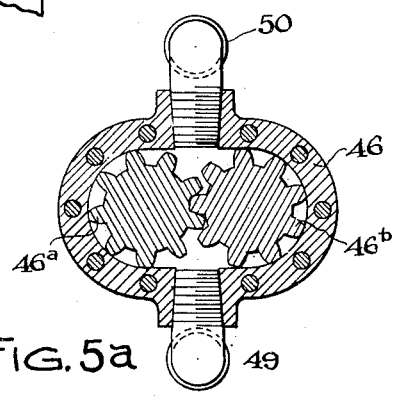
Fig. 5a is a section on the line 5a—5a of Fig. 5.

The elevating member 6a comprises the following: 14, 14a, indicate upper and lower plates to which are connected inwardly extending supports 15. Each support 15 is provided with laterally extending upper and lower stud shafts carrying rollers 15a which roll on and are guided by the walls of the guide members 13 (see Fig. 5), whereby the elevating member may be raised and lowered.

Figure 3:
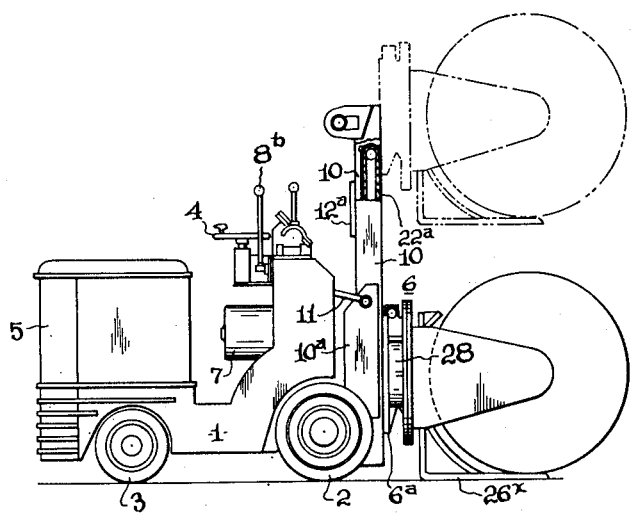
Fig. 3 is a view similar to Fig. 1, but showing a different form of carrier.
Figure 4:
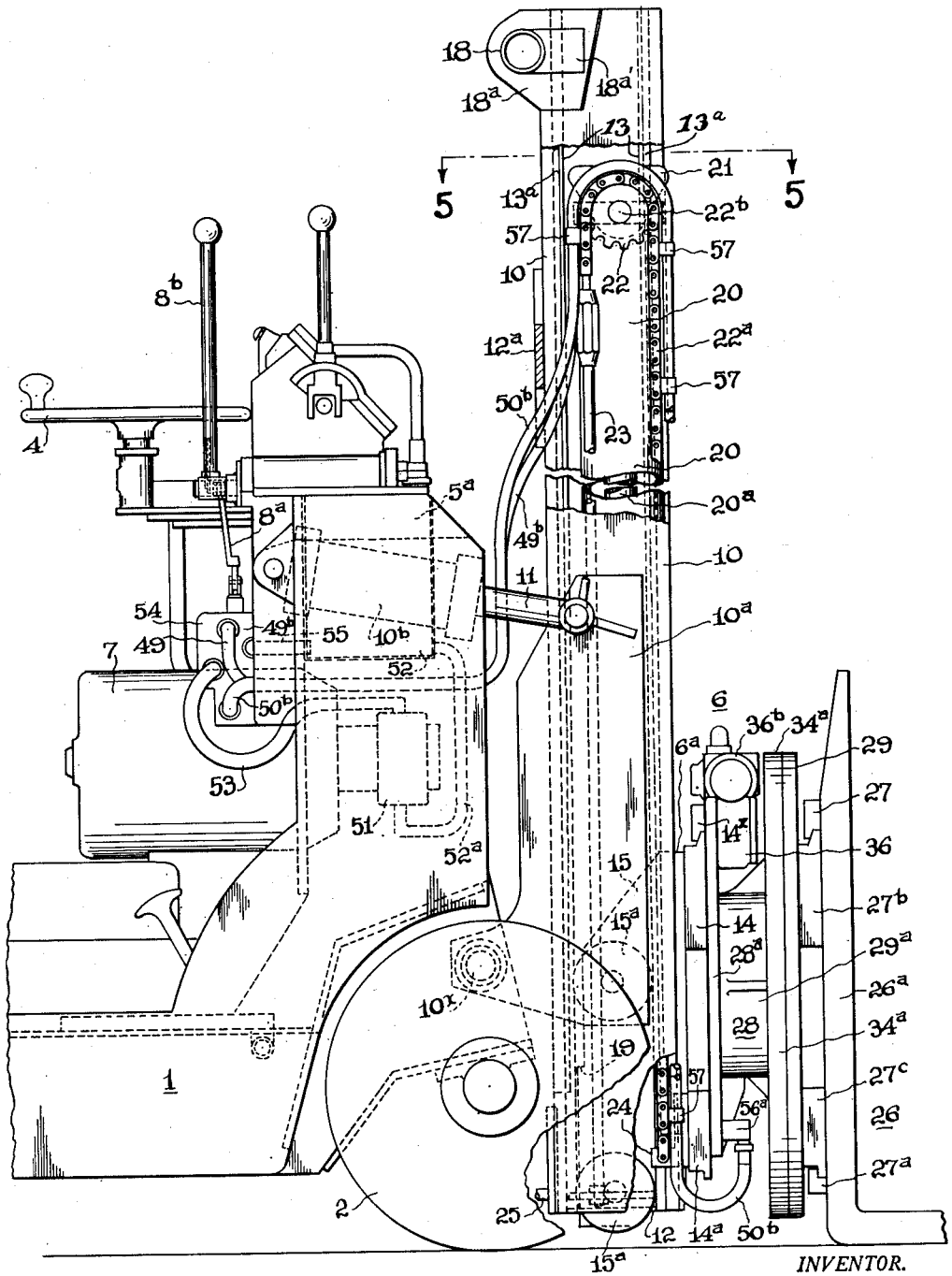
Fig. 4 is a fragmentary side elevation, enlarged, parts being broken away.

The upper ends of the guides 13 are connected by a cross member 18, provided inwardly thereof with abutments 18a disposed in the path of movement of shoulders 19 (see Figs. 4 and 5) on the inner end walls of the roller supports 15, so that in the upward movement of the elevating member 6a, the shoulders 19 engage the abutments 18a and operate therethrough to move the guide members 13 upwardly, as shown in Figs. 1 and 3. The opposite ends of the cross member 18 are provided with end plates 18a' which extend laterally and are suitably secured to the guides 13 (see Fig. 5).

The mechanism for raising the elevating member 6a may be of any desired type, but is shown as consisting of a cylinder 20 mounted on the base 12 midway the guide elements 10 and extending upwardly from the base and enclosing a reciprocatable piston 20x provided with a rod 20a. The upper end of the rod 20a is provided with a head 21 supporting on its opposite ends freely rotatable reeving elements 22 which are mounted on shafts 22b and engaged by the intermediate portions of flexible members 22a. The elements 22 preferably consist of sprockets and the flexible members 22a consist of chains engaging therewith, respectively. The inner ends of the chains 22a are connected to the upper ends of rods 23, the lower ends of which are suitably anchored to the base 12. The outer ends of the chains 22a are secured to angles 24 mounted on the cross plate 14a (see Fig. 4). In this arrangement the flexible members have inner runs which are suitably anchored with respect to the guides and outer runs which are secured to the elevating member 6a. Accordingly, by supplying fluid under pressure through the supply pipe 25 (see Fig. 4) to the lower end of the cylinder 20, the piston therein will be operated upwardly and through the rod 20a operate the elevating member 6a upwardly and the latter in turn through the cross member 18, which is carried by the guides 13, will slide the guide members 13 upwardly; by directing the flow of the fluid from the cylinder to a sump, these parts will gravitate downwardly.

26 indicates a load carrier. In Figs. 1, 2, 4 and 5 the carrier is shown as consisting of a pair of spaced L-shaped members, the vertical legs 26a of which are provided with upper and lower relatively adjustable cross members 27, 27a, arranged to removably engage supporting elements 27b, 27c, respectively, on a mounting indicated as an entirety at 28, which in turn is preferably removably mounted on the elevating member 6a as later set forth. Fig. 3 shows a different form of carrier 26x adapted to handle rolls, such as paper rolls; the carrier 26x is removably mounted on the mounting 28 similarly to the carrier 26.

The mounting 28 consists of an inner member 28a preferably of substantially annular shape and having an outwardly extending integral collar 28b concentric to the axis of the annular member 28a and an outer member 29 preferably of annular shape and having an inwardly extending collar 29a preferably concentric to the axis of the member 29 and collar 28b. Either collar may be of a size to telescopically fit within the other collar; in the preferred arrangement, the collar 28a is disposed within the collar 29a. In this arrangement, the opposed walls of the collars 28b, 29a, form seats for the races of anti-friction bearings 30, to rotatably support the outer member 29 on the inner member 28a. The bearings 30 preferably consist of inner races 30a, 30b, and outer races 30c, 30d, the race 30a being seated in the angle formed by the member 28a and collar 28b and the race 30c being engaged by a split resilient ring 31 adapted to be locked in an annular groove formed in the inner face of the collar 29a, whereas the race 30b is seated on the collar 28b and held in position by a disk 32, which closes the outer open end of the collar 28b, and the race 30d is engaged by a split resilient ring 31a adapted to be locked in an annular groove formed in the inner face of the collar 29a. As shown, the races 30a, 30c and 30b, 30d, engage anti-friction rollers 30e, disposed on reversely extending radii of the axes of the collars 28b, 29a, to maintain the collars 28b, 29a, in operative, rotatable relation. The collar 28b adjacent its outer end is provided with an inwardly extending circumferential rim 33 engaged by an annular wall 32a on the inner face of the disk 32, the disk 32 being secured to the rim 33 by counter-sunk cap screws 32b.

The supporting elements 27b, 27c, are preferably secured in spaced parallel relation to the outer member 29 by counter-sunk cap screws 27d and the opposite or remote outer side edges of these elements are cut away from end to end to provide undercut projecting walls 27x adapted to be removably engaged by complementary walls 27z on the opposed side edges of the cross members 27, 27a. In positioning the carrier on the rotatable member 29, the end walls 27z are brought into alinement with the adjacent open ends of the cut-aways forming the walls 27x and mated with the latter walls and then the supporting members are slid endwise of the members 27b, 27c, until the load carrying members 26 are in normal position, that is, equally spaced from an imaginary axis and disposed longitudinally and midway of the guides 10.

The mounting 28 is removably secured to the elevating member 6a by under-cutting the upper side edge of the cross member 14 to form a wall 14x and providing on the top portion of the inner member 28a spaced bars 14z the lower edges of which are shaped to engage the wall 14x, the lower portion of the inner member 28a being secured to the cross member 14a by cap screws 14x'.

Figure 6:
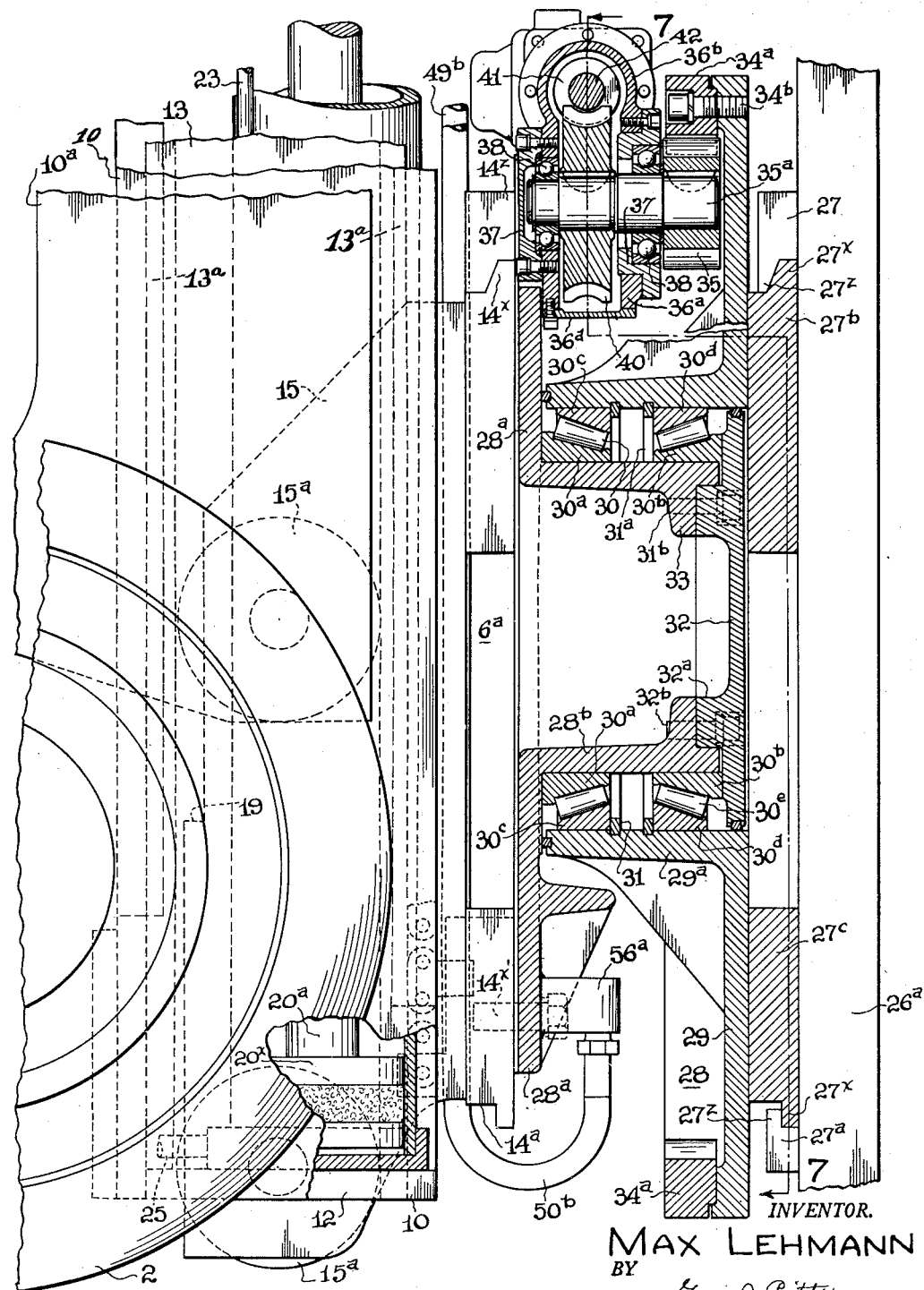
Fig. 6 is a fragmentary side elevation, parts being broken away and parts being in section on the line 6—6 of Fig. 7.
Figure 7:
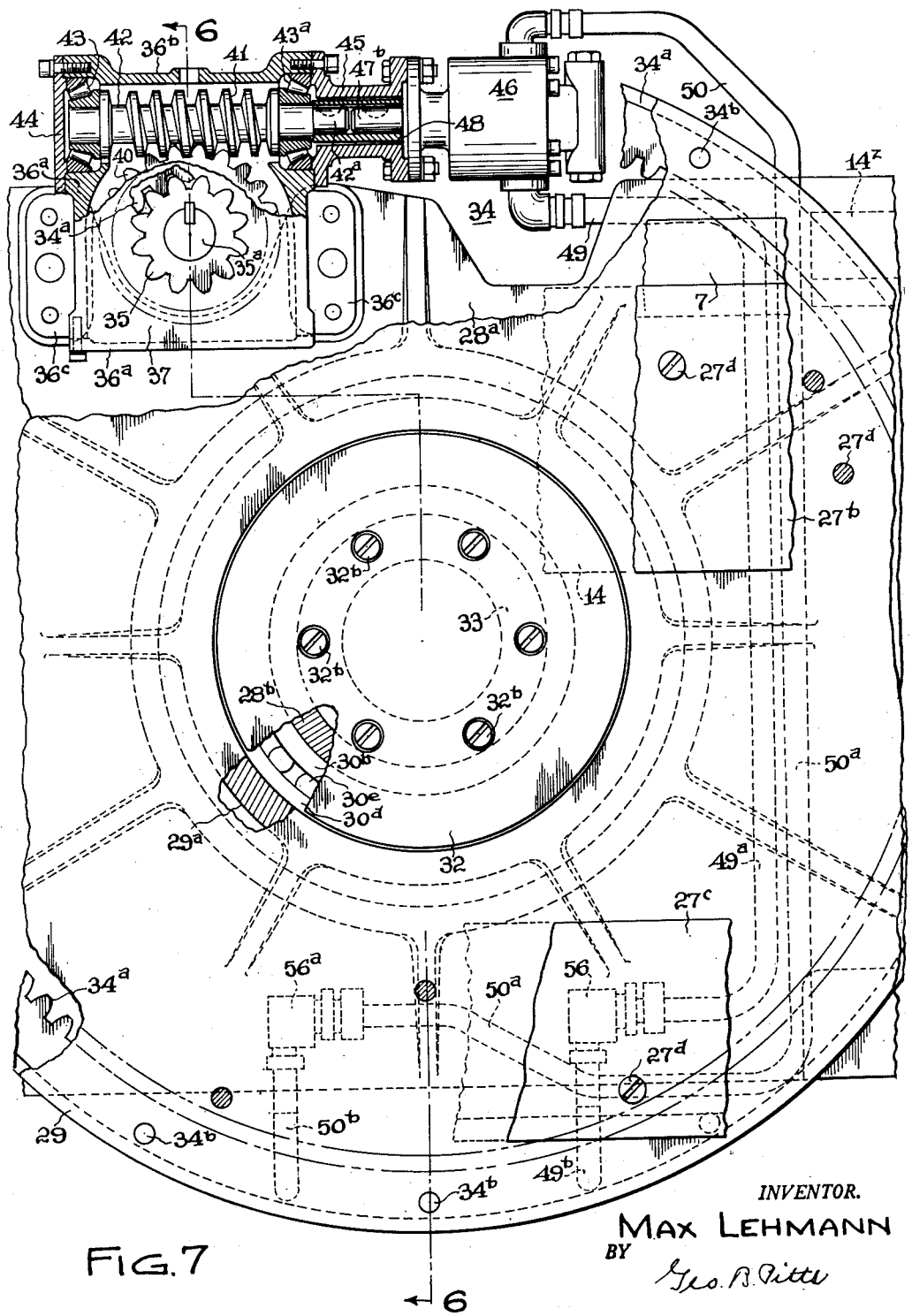
Fig. 7 is a fragmentary section on the line 7—7 of Fig. 6.

34 indicates as an entirety power mechanism for rotating the member 29, whereby the carrier 26 may be moved to and held or supported in load pick-up position, a load picked up, the load elevated to a safe carrying position and transported to the place of discharge. After the load is loaded on the carrier 26, the latter may be rotated any desired angular distance in either direction, dependent on the shape of the load and/or its contents, to insure safe and expeditious transportation thereof to the place of discharge; also, at the place of discharge the carrier and load 26 may be rotated any desired angular distance in either direction to effect discharge of the load. The power mechanism 34 consists of the following: 34a indicates an internal gear fixed to the inner face of the outer rotatable member 29 by counter-sunk cap screws 34b and meshing with a pinion 35, which is fixed to the outer end portion of a shaft 35a. As shown in Fig. 6, the diameter of the gear 34a is equal to that of the member 29. In this arrangement, the application of the power or torque to rotate the carrier is at the maximum distance radially of the axis of the member 29 and hence a minimum power supply, commensurate with the weight of the load to be handled, is required. 36 indicates a housing formed of spaced walls 36a and an upper integrally connected hollow member 36b, the inner housing wall 36a having lateral extensions 36c suitably secured to the inner annular member 28a above the collars 28b and 29a. The lower end of the housing 36a is closed by a removable plate 36d. The spaced walls 36a accommodate inserts 37 which support suitable anti-friction bearings 38 for the shaft 35a. 40 indicates a worm gear disposed within the housing 36 and keyed to the shaft 35a, between the bearings 38. The worm gear 40 is in mesh with a worm 41 integral with a shaft 42, which is mounted in suitable outer and inner anti-friction bearings 43, 43a, seated in the end walls of the tubular member 36b. The outer bearing 43 is held in position by a cap plate 44, whereas the inner bearing 43a is held in position by a hollow member 45 which is axially related and rigidly secured at one end to the adjacent end of the tubular member 36b. The opposite end of the member 45 is rigidly secured to a housing 46 for a suitable hydraulic motor. As shown in Fig. 7, the inner end 42a of the shaft 42 and the outer end 47 of the shaft for the hydraulic motor extend into the hollow member 45 and both shaft ends 42a, 47, fit in and are suitably keyed to the inner walls of a sleeve 48, whereby the motor is drivingly connected to the shaft 42, and through the gearing 41, 40, 35, 34a, to the rotatable carrier supporting member 29. The hydraulic motor within the housing 46 consists of elements 46a, 46b, the opposite ends of which are reduced and rotatably mounted in suitable anti-friction bearings provided in the end walls of the housing 46, the inner reduced end of one element being extended and forming the motor shaft 47 (already referred to), which is driven in either direction dependent on the direction of flow of the liquid under pressure, through the pipes 49, 50, supplied by a pump 51, when the motor 7 is driven, rotate the shaft 47. The liquid is drawn from a reservoir 52 through pipe 52a and discharged from the pump 51 through pipe 53 to a valve mechanism 54. The valve 54 is operated through a linkage 8a by a handle 8b to effect flow of the liquid through either pipe 49, 50, to the motor 46 and return flow through the other pipe and discharge of the liquid through a pipe 55 to the reservoir 52.

From the foregoing description it will be observed that power to rotate the carrier is provided by a hydraulically operated motor of the gear type through a shaft to a worm and worm gear and the latter is drivingly connected to a gear of maximum diameter. Thus a simplified construction of power unit is provided, capable of being driven in either direction by a uniform supply of energy in the form of liquid under pressure, and the applied power is transmitted through gear elements (worm and worm gear) which serve to eliminate jerks and vibrations to the load carrier during operation thereof and when the motor is stopped, the carrier is locked by these elements against movement and hence separate mechanical or other means to lock the carrier are not required. It will also be observed that this form of hydraulic motor consists of few parts and permits it to be mounted in a simple manner and fully accessible with its shaft extending transversely to the elevating member and drivingly connected through a simple arrangement of speed reducing gears to the supporting member 29 for the load carrier 26, whereby minimum power is required for operating the latter. The pipe 49 consists of inner and outer sections 49a, 49b, and the pipe 50 consists of inner and outer sections 50a, 50b. The pipe sections 49a, 50a, are preferably formed of suitable metal connected at their inner ends to opposite sides of the motor housing 46 and at their outer ends to fittings 56, 56a, respectively, suitably welded to the lower portion of the annular wall 28a, whereas the pipe sections 49b, 50b, are formed of flexible material and extend from the fittings 56, 56a, to the valve 54. The intermediate portions of the flexible pipe sections 49b, 50b, are incorporated with and supported by elements of the elevating mechanism 6 for movement therewith, whereby sagging, kinking, twisting or distortion of these sections during movement of the elevating member 6a in either direction, is eliminated. Referring to Figs. 1, 4, 5 and 6, those portions of the flexible pipe sections 49b, 50b, approximating the length of the chains 22a extending from angles 24 to the rods 23, are detachably connected to the chains 22a, respectively, by suitable devices, preferably clips 57, which are provided on spaced links of the chains 22a, whereby such portions of the pipe sections 49b, 50b, move therewith and around the sprockets 22 during raising and lowering of the elevating member 6a. The inner portions of the pipe sections 49b, 50b, extend from the inner end portions of the chains 22a downwardly within the plate 12a and below the reservoir 52 to the valve 54. In this arrangement, the inner and outer portions of the flexible pipe sections 49b, 50b, are supported by the sprockets 22 in the form of loops between the valve 54 and the elevating member 6a and when the latter is raised, the outer runs of the loops are automatically shortened and the inner runs of the loops are correspondingly lengthened and when the elevating member is lowered the inner runs of the loops are shortened and their outer runs are lengthened, and hence compensate for all movements of the elevating member 6a. Accordingly, the pipe sections 49b, 50b, are supported throughout their lengths during movement of the elevating member from end to end of the guides 10, 13. As the outer pipe sections 49a, 50a, are supported by the motor housing 46 and fittings 56, 56a, respectively, in fixed relation to the inner member 28 and the elevating member 6a, liquid connections between the hydraulic motor for rotating the carrier supporting member 29 and the valve 54 are maintained while permitting tilting of the guides and raising and lowering of the elevating member 6a, as well as loading and unloading operations, and during movement of the latter, slack in these connections is eliminated and all portions of the pipes 49, 50, are supported at all times to insure unimpaired and uniform flow of the liquid in either direction therethrough.

Figs. 8, 9 and 10 illustrate a modified form of mounting for the flexible pipes 49b, 50b, on the elevating mechanism 6. In this form of construction, each of the shafts 22b are of a length to rotatably support a sprocket 22 and a pulley 58 around which one of the flexible pipe sections 49b, 50b, reeve during raising and lowering of the elevating member 6a, the pulley 58 having a pitch diameter equal to that of the adjacent sprocket 22.

It will be observed that in operation of the elevating member upwardly and downwardly the pipe sections 49b, 50b, will reeve around the pulleys 58 to compensate for the movement of the elevating member 6a. The pipe sections 49b, 50b, are preferably removably anchored to the member 12a by a suitable clamp 59 to relieve pull on the other portions of the pipe sections during upward movement of the pulleys 58.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a truck, the combination with a frame having substantially vertically disposed guides and an elevating member slidably mounted on said guides of a load carrier movably mounted on said elevating member, hydraulically operated means carried by said elevating member and drivingly connected to said carrier, means on said frame for supplying liquid under pressure, liquid connections between said supply means and said hydraulically operated means, means for sliding said elevating member endwise of said guides, said sliding means including a vertically movable rod disposed between said guides and provided at its upper end with laterally extending shafts, power means for moving said rod upwardly, reeving elements rotatably mounted on said shafts, flexible members engaging said reeving members, anchored at their inner ends and connected at their outer ends to said elevating member, and separate reeving members mounted on said shafts for rotation independently of said first mentioned reeving members, intermediate portions of said liquid connections being flexible and adapted to engage said separate reeving members for taking up or paying out said liquid connections dependent on the direction of movement of said elevating member.

2. In a wheel mounted vehicle, the combination with a frame having an elevating member, means on said frame for supplying liquid under pressure and a load carrier, of a mounting for said carrier on and movable with said elevating member, said mounting consisting of an inner member fixed to said elevating member and an outer member, on which said carrier is supported, movably mounted on said inner member, hydraulically operated means on said inner member drivingly connected to said outer member for moving it in one direction, means for raising said elevating member consisting of guides supported on said frame for said elevating member, power mechanism having a movable device, shafts mounted on said device, a pair of reeving elements rotatably mounted on said shafts, flexible members having engagement intermediate their ends with said elements and fixedly related at their inner ends to said guides and connected at their opposite ends to said elevating member, a separate pair of reeving elements mounted on said shafts for rotation independently of said first mentioned reeving elements, and liquid connections between said hydraulically operated means and said liquid supply means, intermediate portions of said connections being flexible and engaging said separate pair of reeving elements during raising and lowering movement of said elevating member.

3. In a wheel mounted vehicle, the combination with a frame having an elevating member, means on said frame for supplying liquid under pressure and a load carrier, of a mounting for said carrier on and movable with said elevating member, said mounting consisting of an inner member fixed to said elevating member and an outer member, on which said carrier is supported, rotatably mounted on said inner member, a hydraulically operated motor on said inner member drivingly connected to said outer member for rotating it, means for raising said elevating member consisting of a head mounted on said frame for movement vertically and provided at its opposite sides with laterally extending shafts, means for raising said head, a reeving element rotatably mounted on each of said shafts and flexible members having engagement intermediate their ends with said elements to provide inner and outer runs, the inner runs being anchored and the outer runs being connected to said elevating member, whereby raising of said head serves to raise said elevating member, a separate reeving element rotatable on each of said shafts independently of the first mentioned reeving element thereon, and liquid connections between said motor and said liquid supply means, intermediate portions of said liquid connections being flexbile and engaging said separate reeving elements during raising and lowering of said elevating member.

4. In a vehicle, the combination with a frame having vertically disposed guides, an elevating member slidably mounted on said guides and a load carrier, of means for raising said member consisting of a vertically disposed rod between said guides and provided at its upper end with reeving elements, flexible members connected to said frame and said elevating member and engaging said reeving elements intermediate their end portions and mechanism for raising said rod, a mounting for said carrier movable with said elevating member, said mounting consisting of an inner member fixed to said elevating member and provided with an outwardly extending annular wall and an outer member, on which said carrier is supported, provided with an inwardly extending annular wall surrounding said first mentioned annular wall, bearings between said annular walls, whereby said outer member is rotatably supported on said inner member, means for rotating said outer member consisting of a reversible hydraulically operated motor mounted on said inner member, driving connections between the shaft of said motor and said outer member, valve controlled means for circulating liquid under pressure to said motor to drive it in either direction, intermediate sections of said circulating means consisting of flexible conduits, and devices rotatably mounted on the upper end of said rod and movable therewith for supporting said flexible conduit sections independently of said reeving elements and said flexible members during raising and lowering of said elevating member.

MAX LEHMANN.

REFERENCES CITED

The following references are of record in the file of this patent:

UNITED STATES PATENTS

| Number | Name | Date |
| --- | --- | --- |
| 1,878,994 | Abbe | Sept. 27, 1932 |
| 2,281,004 | Lehmann et al. | Apr. 28, 1942 |
| 2,287,469 | Cochran | June 23, 1942 |
| 2,335,572 | Schroeder | Nov. 30, 1943 |
| 2,391,813 | Wood | Dec. 25, 1945 |
| 2,432,411 | Guerin et al. | Dec. 9, 1947 |
| 2,457,366 | Guerin | Dec. 28, 1948 |
| 2,513,928 | Frischmann | July 4, 1950 |
| 2,528,401 | Ulinski | Oct. 31, 1950 |